US007596221B2

(12) United States Patent
Langelaar

(10) Patent No.: US 7,596,221 B2
(45) Date of Patent: Sep. 29, 2009

(54) DETECTION OF A WATERMARK IN A DIGITAL SIGNAL

(75) Inventor: Gerrit Cornelis Langelaar, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 456 days.

(21) Appl. No.: 10/572,653

(22) PCT Filed: Oct. 6, 2004

(86) PCT No.: PCT/IB2004/051991

§ 371 (c)(1),
(2), (4) Date: Apr. 5, 2006

(87) PCT Pub. No.: WO2005/036459

PCT Pub. Date: Apr. 21, 2005

(65) Prior Publication Data

US 2007/0003059 A1    Jan. 4, 2007

(30) Foreign Application Priority Data

Oct. 10, 2003    (EP) .................................. 03103749

(51) Int. Cl.
*H04N 7/167* (2006.01)
(52) U.S. Cl. ........................ 380/201; 380/217; 713/176; 382/232
(58) Field of Classification Search ................. 380/201, 380/217; 713/176; 382/232
See application file for complete search history.

(56) References Cited

U.S. PATENT DOCUMENTS 6,477,431 B1    11/2002    Kalker et al.

(Continued)

FOREIGN PATENT DOCUMENTS

GB    2349536 A    11/2000

(Continued)

OTHER PUBLICATIONS

Ton Kalker, et al: A Video Watermarking System for Broadcast-Monitoring, SPIE, vol. 3657, No. 25, Jan. 1999, pp. 103-112. XP000949142.

(Continued)

*Primary Examiner*—Emmanuel L Moise
*Assistant Examiner*—Paul Callahan
(74) *Attorney, Agent, or Firm*—Larry Liberchuk

(57) ABSTRACT

Watermark detectors have a buffer in which a number of image tiles are folded and accumulated prior to computing the correlation between buffer contents and the watermark pattern being looked for. The intention of the folding and accumulation process is to average out the video content while accumulating the embedded watermark energy. This no longer appears to hold for strongly compressed video, such as DIVX, which exhibits a lot of artificial noise and undesired similarity (block patterns). As a result thereof, correlation peaks are often below the threshold. In a similar manner, the compression affects scale detection. According to this invention, only frames (or parts thereof) that are not so heavily compressed and therefore have a high probability of carrying enough watermark energy are folded and accumulated. To this end, a quality metric is calculated, the quality metric being indicative of the degree of compression of the data. The quality metric may be calculated based on the compressed data itself or derived from the decompressed base-band data. An advantageous example is the number of non-zero DCT coefficients of a (residue) frame. A determination is then made as to whether to exclude the frame (or part thereof) from the watermark decode process. The quality metric may also be used to select data for use in a scale detection process.

6 Claims, 1 Drawing Sheet

Figure 1:
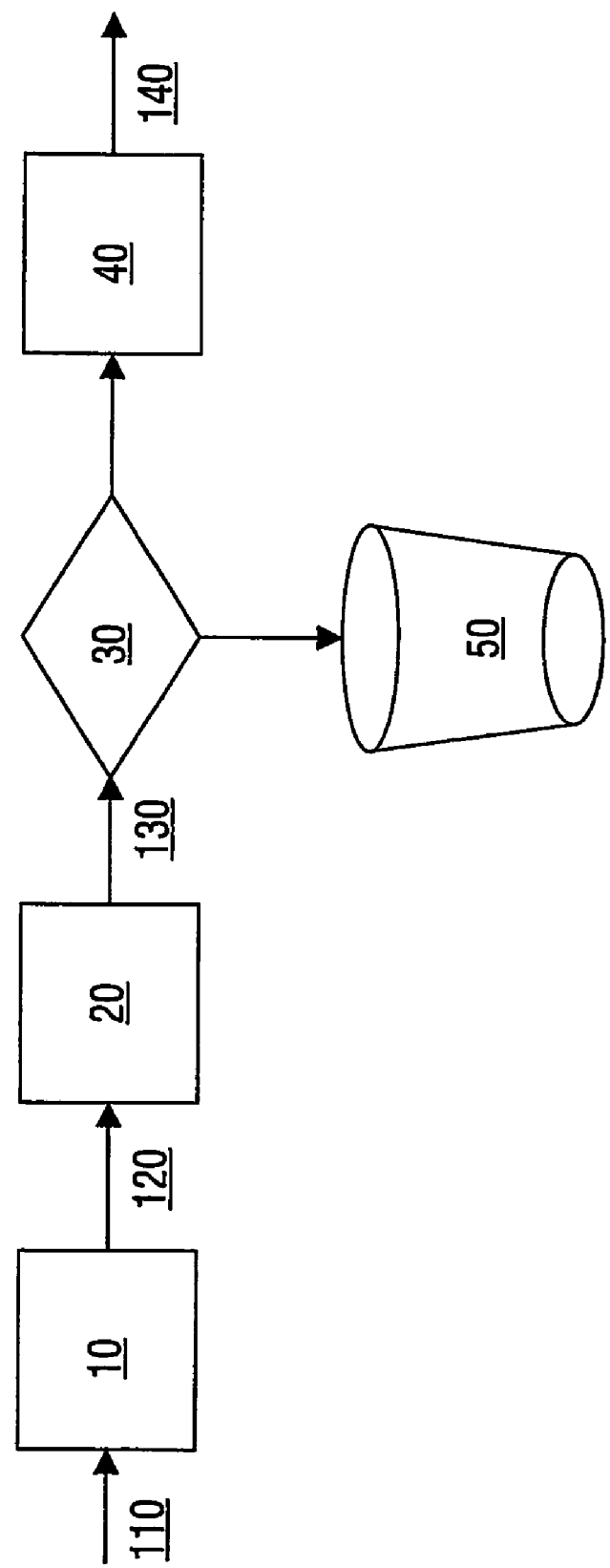

U.S. PATENT DOCUMENTS 6,700,990 B1 * 3/2004 Rhoads ....................... 382/100
6,879,701 B1 * 4/2005 Rhoads ....................... 382/100
2002/0157005 A1   10/2002 Brunk et al.

FOREIGN PATENT DOCUMENTS

| JP | 2523011 B2 | 5/1996 |
|---|---|---|
| WO | 9945705 A2 | 9/1999 |
| WO | 02065753 A1 | 8/2002 |
| WO | 03005357 A1 | 1/2003 |

OTHER PUBLICATIONS

Langelaar G. C. et al: Watermarking Digital Image and Video Date, IEEE vol. 17, No. 5, Sep. 2000, pp. 20-46, XP000992265.

* cited by examiner

DETECTION OF A WATERMARK IN A DIGITAL SIGNAL

The present invention relates to the detection of watermark signals embedded in digital data, the data typically representing multimedia content. A typical format for such data is MPEG2, although the invention may be used with other formats also.

In order to embed certain information, such as copyright, copy control, source or authentication data into a digital signal, a technique known as watermarking is often used. This involves processing the digital data so that a recognizable pattern is 'overlaid' onto the data to be watermarked. Different types of watermark have different uses. A simple robust watermark, which is intended to survive a wide range of processing steps in the analogue and digital domains, may simply indicate that the watermarked data is subject to copyright, and may provide further details, such as owner and date. A fragile watermark is often added in such a way that it is corrupted or broken if the data is processed in any way. In this way, the absence of a fragile watermark in a data file, or stream, in which one was expected, can indicate that the data has been processed or otherwise tampered with. This can be useful in medical or forensic science applications where authenticity is crucial.

The various types of watermark pattern themselves consist of a pseudo-noise signal which is overlaid onto, or woven into, the data itself. The watermark signal should ideally not degrade the source data in a perceptible manner, but should be detectable by a suitable decoder.

A particular problem arises when the watermarked data is compressed to a very low bit-rate, suitable for transmission over the Internet, or other data transfer system. DIVX is one system which produces very low bit-rates, and is widely used to reduce the amount of bandwidth required to transmit video images over the Internet.

Currently used watermarking systems such as JAWS (Ton Kalker, Geert Depovere, Jaap Haitsma, Maurice Maes, "A Video Watermarking System for Broadcast Monitoring", Proceedings of SPIE Electronic Imaging '99, Security and watermarking of Multimedia Contents, San Jose (Calif.), USA, Jan. 1999) use detectors which search for embedded watermarks by collecting large amounts of video data, which is then folded and accumulated before the accumulated data is correlated with the expected watermark pattern. With video data that has been compressed to a very low bit-rate, e.g. using DIVX, a frequently encountered result is correlation peaks which occur below the detection threshold. This means that detection of the embedded watermark(s) may fail, which can cause inconvenience for users of the system who may be authorized to view the watermarked video, but are prevented from doing so in the absence of a proper detection of the watermark(s).

A further problem occurs when the watermarked video has been scaled or re-sized. In order to detect an embedded watermark, the original scale of the video signal is required, so that the accumulation buffer, which captures incoming video data, can be correspondingly scaled to the original video dimensions. The original scale must be determined from the scaled video data itself. Compared to the watermark detection process, where the video data is correlated against known watermark data, prior art scale-detection processes operate by correlating two noisy accumulation buffers with each other to yield the scale factor.

In the JAWS system, watermark detection and the watermark detection process and the scale retrieval process make use of a repetitive watermark pattern being embedded in the source data. During the watermark embedding process, a 128×128 watermark pattern is 'tiled' over the full extent of a frame of data.

In order to retrieve the horizontal scale information from a scaled version of the data, the process begins by arbitrarily selecting two horizontally adjacent tiles A and B from a number of accumulated frames. The two tiles are then correlated with each other according to the following steps:

Calculate 128×128 Hanning window over A and B; Han (A), Han(B)

A Hanning window is a kind of filter which acts to 'fade out' the edges of the tile to which it is applied. In this way, the data in the centre of the tile is preserved, but closer to the edges, the data fades to zero. This alleviates the effect of edges introducing strong artificial frequency components in the ensuing FFT calculation.

Calculate 128×128 Fast Fourier Transform (FFT) over A and B

Calculate complex conjugate of Han(B); Con(Han(B))

Calculate pointwise multiplication of Han(A) and Con (Han(B))

Normalise multiplication result. This is done according to the following formula for each complex value (z) in the result, so that z is replaced by $$\frac{z}{\sqrt{re(z)^2 + im(z)^2}}$$

Calculate Inverse FFT of previous step

The position of the highest value in the first row of the IFFT result is then used to calculate the horizontal scale factor. If the first value is the highest, then the horizontal scaling factor is 1 i.e. no scaling has occurred.

The vertical scaling factor is calculated in a similar way, but two vertically adjacent tiles and the first column of the IFFT result are used instead.

The correlation peaks for this scale retrieval process are even lower than for the watermark detection process due to the inherently more noisy buffer samples used. (Watermark detection involves a correlation between a known pattern and a noisy accumulation buffer: scale detection is a correlation between two noisy accumulation buffers). To further complicate matters, frame folding may not be used in the scale detection process. This is because frame folding can only be used if the scale is known. If the scale is not known, patterns are accumulated that are not synchronised and the resulting accumulation buffer is useless. As a result, only accumulation can be used. This means that more frames must be collected before correlation can be performed, which, of course, takes more time.

Folding works by 'magnifying' the watermark data, as it always has the same sign. The underlying video signal is effectively 'random' and so averaged out. Folding for long enough results in the original watermark pattern. However, if the patterns (tile of 128×128) are not exactly aligned the process does not work.

Prior art techniques attempt to alleviate these problems by accumulating more frames per detection in the hope that the video data averages out and the watermark signal amplifies, so that the signal (watermark) to noise (video) ratio increases.

In a typical scale-detection, up to 300 frames are currently used. However, in the case of DIVX compressed video, a lot of artificial noise and undesired similarity, caused by block patterns, is introduced. During the accumulation process, more noise than watermark energy is generally accumulated. Also, the undesired patterns are amplified as well, and are usually stronger than the watermark signal. All these problems make reliable scale-detection of DIVX video difficult, and often impossible. Without reliable scale detection, watermark detection is not possible.

An object of embodiments of the present invention is to at least alleviate the above mentioned problems experienced with prior art detection systems, and provide a better watermark detection system for use with highly compressed video or other multimedia data.

A further object of embodiments of the present invention is to allow the performance of a more reliable scale detection process before watermark detection is carried out.

According to the present invention, there is provided a method of selecting data for use in decoding an embedded watermark in compressed multimedia data, comprising the steps of:

calculating a quality metric for a given part of the compressed multimedia data based on the degree of compression of the multimedia data;

including in a watermark decoding process, the given part, if its quality metric is higher than a certain threshold, and;

excluding from the watermark decoding process, the given part, if its quality metric is lower than the threshold.

Preferably the method further includes the step of using the same quality metric to select data to use in a scale-detection process performed before the watermark decoding process. In cases where no scaling has taken place, this will return a scale factor of 1. Otherwise, the scale-detection process will return a value which allows accumulation buffers to be sized appropriately before a watermark is decoded.

Preferably, the quality metric is calculated on the basis of an analysis of a compressed data stream. Such a compressed data stream is provided by DIVX systems.

Suitably, in cases where access to the compressed data stream is possible, the quality metric may be determined on the basis of one of: Quantisation factors; the number of Variable Length Codewords (VLCs) used to code a data frame; Motion Vectors.

The quality metric may also be calculated on the basis of a plurality of parameters.

Preferably, the quality metric may be calculated on the basis of an analysis of base-band data.

Preferably the quality metric is calculated on a measure of the energy of a frame.

The quality metric may also be calculated on the basis of a plurality of parameters.

Preferably, the given part of the data is a frame. Alternatively, part-frames may also be used.

Preferably, apparatus is provided to perform the method according to the invention.

For a better understanding of the present invention, and to understand how the same may be brought into effect, the invention will be described, by way of example only, with reference to the appended drawings in which:

FIG. 1 shows a schematic representation of an embodiment of the present invention.

FIG. 1 shows a schematic representation of the data flow in an embodiment of the invention. A data buffer 10 is arranged to receive an incoming data stream 110. The data stream 110 is, in a particular embodiment, a DIVX coded video data stream. Data buffer 10 operates to select all or part 120 of a frame of the incoming data stream, which is then analysed in quality metric calculator 20. Quality metric calculator operates on the data frame (or part thereof) 120 to establish a quality metric 130 of the input data frame 120. The quality metric is indicative of the likelihood of the particular frame including sufficient watermark energy to be used in the watermark decoding process. Methods of calculating the quality metric will be presented shortly.

The quality metric 130 is compared with a pre-defined level in threshold detector 30. If the quality metric indicates a high probability of the frame 120 including a suitable quantity of watermark energy, then the frame 120 is made available to the watermark detection process 40.

If, however, quality metric 130 falls below the pre-defined acceptable level, the threshold detector discards 50 the data in frame 120 and it will play no part in the watermark decoding process 40.

In this way, only data which has a higher probability of including sufficient watermark energy to enable a successful decode of the watermark to be performed is passed to the watermark decoding process. The output of the watermark decode process is watermark 140. Alternatively, the output 140 could be a binary signal indicating either a correct decode or that no watermark was detected.

In order to determine a quality metric (Q), one or more characteristics of the data is assessed or measured. The following examples highlight attributes which may be used in some situations. The skilled man will be aware of other attributes which may form the basis of a quality metric calculation in other situations.

The quality metric (Q) effectively provides a measure of how much the subject data has been compressed. The more compressed the data, the harder it is to extract the watermark from it.

If access to the compressed data stream is possible, there are several parameters available from the stream itself which may be used in order to determine a quality metric (Q). Some suitable parameters are:

Quantisation Factors

The number of Variable Length Codewords (VLCs) used to code a frame

Motion Vectors

In a system where access to the compressed data stream is possible, a quality metric may be derived by counting the number of VLCs used to code a frame. In this case, only frames coded with more than 5000 coefficients are folded and used in the watermark detection process.

In many instances, however, access to the original compressed stream is not possible and only access to the base-band video signals is possible, for example. In such instances, access to the previously mentioned parameters is not possible and so different measures may be used to determine Q. One such measure is:

A measure of Energy. Such a measure can be obtained, for example, by 8×8 DCT transforming blocks of a frame, quantise the coefficients with a coarse standard MPEG Quantisation matrix, and count the number of non-zero coefficients. The non-zero coefficients of a block are indicative for its energy content. If there are many high coefficients around DC frequency, this indicates that there are sharp edges in the block. A lot of non-zero coefficients means that the block has a complex structure. If there are no AC coefficients, this means that the block is flat In general, the more non-zero coefficients there are, the more watermark energy there is likely to be available in the block.

Once a suitable quality metric (Q) has been calculated from one or more given attributes of the signal, it is possible to establish a threshold for a particular value of Q, such that data frames (or parts thereof) having a value of Q which falls below the threshold, can be discarded for the purpose of decoding an embedded watermark. The actual data frame (or part thereof) is of course retained so that its inherent data content (e.g. video) can be decoded.

The establishment of a threshold depends on the particular attribute of the data signal which was chosen as the basis of the quality metric, and may best be determined in a particular case by experimentation.

As stated previously, a further problem arises when the compressed video signal has been scaled. Before the watermark can be decoded from the compressed signal, the original scale of the signal has to be recovered.

Embodiments of the present invention operate to recover scale information in a similar way to that just described to recover watermark information. To recover scale information, two accumulation buffers are correlated, with the resultant correlation giving a direct indication of the scale factor.

In order to improve the results of the correlation process, the same quality metric (Q) calculated above can be used to identify candidate frames (or parts thereof) which are less heavily compressed, and thus have a higher Q. These candidate frames can be used for the scale-determining correlation process in preference to frames (or parts thereof) which are more heavily compressed, and thus have a lower Q.

Experiments have shown that the scale detection process is greatly improved by being selective about which data samples are used in the correlation process. In cases where the correlation peaks would otherwise be below a defined detection threshold using prior art methods, making scale detection impossible, it is found that embodiments of the invention are able to determine scale factors by selectively discarding certain data samples which do not contribute to a successful correlation.

In effect, the same technique may be used firstly to discover the scale factor of the compressed signal, which can then be used to scale the accumulation buffer appropriately and, secondly, to enable a more reliable watermark decode to take place.

Embodiments of the invention may be implemented using suitably conditioned or programmed hardware. Such hardware may include specialised hardware such as a custom ASIC, or a more general processor or DSP including operating according to a suitable program.

The skilled man will be aware of other parameters which may be used as the basis for calculating a quality metric, and the examples illustrated herein are not intended to limit the scope of the present invention, which is to be determined by the appended claims.

The invention claimed is:

1. A computer based method of selecting data for use in decoding an embedded watermark in compressed multimedia data, comprising:
   calculating a quality metric for a given part of the compressed multimedia data, based on the degree of compression of the multimedia data;
      including in a watermark decoding process, the given part, if its quality metric is higher than a certain threshold, and;
      excluding from the watermark decoding process, the given part, if its quality metric is lower than the threshold,
      wherein the method additionally includes using the same quality metric to select data to use in a scale-detection process performed before the watermark decoding process.

2. A computer based method of selecting data for use in decoding an embedded watermark in compressed multimedia data, comprising:
   calculating a quality metric for a given part of the compressed multimedia data, based on the degree of compression of the multimedia data;
   including in a watermark decoding process, the given part, if its quality metric is higher than a certain threshold, and;
   excluding from the watermark decoding process, the given part, if its quality metric is lower than the threshold,
   wherein the quality metric is calculated on the basis of one of the following parameters associated with the compressed data stream: Quantisation factors; the number of Variable Length Codewords (VLCs) used to code a data frame; Motion Vectors.

3. The method as claimed in claim 2 wherein the quality metric is calculated on the basis of a plurality of parameters associated with the compressed data stream.

4. A computer based method of selecting data for use in decoding an embedded watermark in compressed multimedia data, comprising:
   calculating a quality metric for a given part of the compressed multimedia data, based on the degree of compression of the multimedia data;
   including in a watermark decoding process, the given part, if its quality metric is higher than a certain threshold, and;
   excluding from the watermark decoding process, the given part, if its quality metric is lower than the threshold,
   wherein the quality metric is calculated on the basis of an analysis of base-band data.

5. The method as claimed in claim 4 wherein the quality metric is calculated on the basis of a measure of the energy of a frame.

6. The method as claimed in claim 5 wherein the quality metric is calculated on the basis of a plurality of parameters associated with the base-band data.

* * * * *